United States Patent
Rochman et al.

(10) Patent No.: US 11,604,604 B1
(45) Date of Patent: *Mar. 14, 2023

(54) EFFICIENT FTL IMPLEMENTATION WITH COMPRESSION

(71) Applicant: Pliops Ltd., Tel Aviv (IL)

(72) Inventors: Yuval Rochman, Ramat Gan (IL); Moshe Twitto, Givat Shemuel (IL)

(73) Assignee: PLIOPS LTD., Tel Aviv (IL)

( * ) Notice: Subject to any disclaimer, the term of this patent is extended or adjusted under 35 U.S.C. 154(b) by 110 days.

This patent is subject to a terminal disclaimer.

(21) Appl. No.: 16/942,659

(22) Filed: Jul. 29, 2020

Related U.S. Application Data (63) Continuation of application No. 16/231,649, filed on Dec. 24, 2018, now Pat. No. 10,860,249.

(60) Provisional application No. 62/744,264, filed on Oct. 11, 2018, provisional application No. 62/732,576, filed on Sep. 18, 2018, provisional application No. 62/610,244, filed on Dec. 25, 2017, provisional application No. 62/869,051, filed on Jul. 1, 2019.

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0679; G06F 3/0685; G06F 3/0688; G06F 12/0238; G06F 12/0246; G06F 2212/2022; G06F 2212/2024; G06F 2212/205; G06F 2212/214; G06F 2212/2142; G06F 2212/2146; G06F 2212/217; G06F 2212/72; G06F 2212/7201; G06F 2212/7202; G06F 2212/7203; G06F 2212/7204; G06F 2212/7205; G06F 2212/7206; G06F 2212/7207; G06F 2212/7208; G06F 2212/7209; G06F 2212/7211; G11C 11/5614; G11C 11/5621; G11C 11/5628; G11C 11/5635; G11C 11/5642; G11C 11/5657; G11C 11/5664; G11C 11/5671; G11C 11/5678; G11C 11/5685; G11C 13/0035; G11C 16/349; G11C 16/3495
See application file for complete search history.

(56) References Cited

U.S. PATENT DOCUMENTS

| | | | | |
|---|---|---|---|---|
| 9,043,530 B1 * | 5/2015 | Sundaram | ............. | G06F 3/0656 711/158 |
| 9,201,751 B1 * | 12/2015 | Muthirisavenugopal | | ................... G06F 16/185 |
| 2016/0357743 A1 * | 12/2016 | Swaminathan | ....... | G06F 16/182 |

* cited by examiner

*Primary Examiner* — Arvind Talukdar
(74) *Attorney, Agent, or Firm* — Reches Patents (57) ABSTRACT

A method for accessing a block of information stored in a SSD memory, the method may include obtaining, by an SSD controller, an identifier associated with the block of information; accessing, using the identifier, a first data structure that maps identifiers to cluster maps; wherein the first data structure comprises block sequence metadata, wherein for at least one cluster map, the block sequence metadata comprises a sequence identifier of a sequence of blocks of information that are sequentially written to the SSD memory and are stored together in a cluster of the SSD memory; accessing a cluster map of a cluster that is associated with the sequence provide block retrieval information; and retrieving the block of information from the SSD memory, using the block retrieval information.

14 Claims, 2 Drawing Sheets

EFFICIENT FTL IMPLEMENTATION WITH COMPRESSION

CROSS REFERENCE

This application is a continuation in part of U.S. patent application Ser. No. 16/231,649 filing date Dec. 24, 2018 which claims priority from U.S. provisional patent Ser. No. 62/610,244, filing date Dec. 25, 2017, from U.S. provisional patent Ser. No. 62/732,576 filing date Sep. 18, 2018 and U.S. provisional patent Ser. No. 62/744,264 filing date Oct. 11, 2018—all being incorporated herein by reference This application claims priority from U.S. provisional patent 62/869,051 filing date Jul. 1, 2019 which is incorporated herein by reference.

BACKGROUND

A NAND block device is a data storage device that supports reading and writing data in fixed-size blocks, sectors. These blocks are generally 4 KB bytes and are usually used in file systems. These blocks are called logical block address (LBA).

The problem of finding offset of an LBA placement in a NAND is difficult. While in Hard Disk Drives (HDD) writing data on-place is possibly and immediately using the CHS conversion, in NAND it is not possible: modifying the content (by read-modified-write) in the NAND takes at least serval hundreds of Megabytes. Thus, in order to avoid the read-modified-write, the placement of the LBAs in the NAND is changes dynamically using Garbage Collection (GC) procedures, and must use a dynamic mapping between the LBA and their offset, called the Flash Translation Layer (FTL).

The standard way to implement an FTL is simply to allocate for each LBA index its physically sector offset in the NAND (i.e., LBA 0 is in sector 5, LBA 1 is in sector 56, etc.).

The problem of using such naïve FTL is the number of bits used: if there are n sectors of 4 KB in the system, one must use $\log_2 n$ bits per LBA to represent its NAND offset. Thus, the space of the mapping is considerably high, and one must use more expensive devices (such as DRAMs) to implement such mapping (e.g more DRAMs chips in the PCB which are expensive and take more space). For example, given system with user capacity is 6.4 TB with 1.6 G sectors of 4 KB) each LBA uses 30.67 bits on average (more than 3.5 bytes per LBA).

Another method to reduce the number of bits in the FTL table is to decoupled pairs of LBAs, i.e. LBAs 2*I and 2*i+1 are pointed in the same NAND sector of 8 KB in the DRAM. This will reduce the number of bits per LBA by 2. In the previous example, the number of bits per LBA is reduces to less than 2 bytes per LBA. The problem with such implementation is that this will increase the write amplification by 2 (i.e., each 4 KB write is followed by modifying 8 KB) and reducing the write I/O per second by 2.

BRIEF DESCRIPTION OF THE DRAWINGS

The embodiments of the disclosure will be understood and appreciated more fully from the following detailed description, taken in conjunction with the drawings in which.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There is provided an FTL which uses a small number of bits per LBA (up to 2 bytes), which does not increases the write amplification. In addition, in order to reduce the costs of using expensive high-capacity NAND, our FTL implementation supports compression, which reduces the data inserted by the user and decreases the space amplification of the SSD. Such mapping supports sequential read as in the naïve approach and may support compression of the LBAs. To this end, the method show the flows of operations.

Basic Operations

Such storage device should be able to store a sequence of LBAs that includes a key (index) and value a of arbitrary length.

Such storage device should be able to retrieve a sequential of LBAs with successive keys to the value to a Host/User, according to keys it was stored with.

The block device mapping should be able to map the key to the physical place it stored the data at in order to locate it when retrieving the data.

The specifics of NAND flash (write once, read many, large erase unit, limited program-erase cycles) impose certain requirements and limitations on the mapping mechanism, which are taken into account at the presented solution.

The mapping resides on random access memory (with faster than flash access, for example DRAM).

The mapping is optimized for low memory-space footprint, thus allowing to map much more LBAs and enabling low latency with no additional reads from flash in order to determine object location on flash.

Our mapping may compress the LBAs in order to place more LBAs in the system

The basic operations for accessing key-value storage device managed with the described database:

PUT(key$_{low}$, key$_{high}$, value)

Write key$_{high}$−key$_{low}$+1 LBAs from indices [key$_{low}$, key$_{high}$] with corresponding value value=GET (key$_{low}$, key$_{high}$,)

Read a sequence of LBAs with the corresponding value

DELETE (key)

Delete an LBA

Block-Clusters Technology

We portioned our storage into serval block-clusters, where cluster number represents the physical place of the LBA. For example, for each instance of database, 1000 block-clusters exist, each cluster is 2 GB and includes 512 NAND blocks. Such configuration results in 10 bit block-cluster indices in a main mapping table.

In a sequential write, i.e., if a sequence of LBAs with successive indices are written, the sequence will remain entirely in the cluster. The sequences in every cluster can be either sorted by the hash value, unsorted, sorted according to another metric (such as the arrival time of the sequence), or semi-sorted (i.e., the cluster can be partitioned into several min-clusters, which either min-cluster is sorted). The hash value of a sequence is simply applying a hash function over the last LBA in the sequence. The storage span by sorted clusters might be smaller than the one span by the unsorted clusters, to reduce the space used to represent the different mappings.

It should be noted that the method may split a sequence of LBAs into two different places in the cluster, if the sequence is spans across two different L2C buckets.

Data Structures

We consider two separate mappings:

a. The logic-to-cluster map (L2C), that given a LBA number, it returns the cluster map of the LBA, and computes the appropriate hash value.

b. The cluster map, which is sorted by the hash value computed in the L2C map.

In addition, one of the cluster numbers represents that the LBA was not inserted to the system. The method may reserve one of the cluster numbers to represent such LBA. In our examples, cluster number of composed only from 0's represents an uninitialized LBA.

L2C

Suppose that the system supports $n_{LBA}$ LBAs, and $n_{Total}$ NAND sectors, which can either contains a valid LBA or an invalid LBA (i.e., $n_{Total}$>$n_{LBA}$).

Suppose that $2^{r-1} \leq n_{LBA} < 2^r$. In order that every L2C bucket will contain (almost) the same amount of entries, given an LBA index $0 \leq i < n_{LBA}$, the method compute its bucket number simply as the $1 \leq t < r$ first MSB-s of the number $$f(i) = \left\lfloor \frac{i}{n_{LBA}} \cdot 2^r \right\rfloor.$$

That means, it m·$2^{r-t}$≤f(i)<(m+1)·$2^{r-t}$(*), then LBA i is in bucket m. Each bucket contains either $$\left\lceil \frac{n_{LBA}}{2^t} \right\rceil \text{ or } \left\lfloor \frac{n_{LBA}}{2^t} \right\rfloor$$

LBAs.

The first LBA of bucket m is either index $$i_0 = \left\lceil \frac{n_{LBA}}{2^t} \cdot m \right\rceil$$

or $i_1 = \lfloor n_{LBA}/2^t \cdot m \rfloor$. Thus, in order to compute the first LBA in bucket m, the method choose the minimum i that satisfies (*).

The last LBA should be either r $$i_0 = \left\lceil \frac{n_{LBA}}{2^t} \cdot (m+1) \right\rceil - 1$$

or $i_1 = \lfloor n_{LBA}/2^t \cdot (m+1) \rfloor - 1$. Thus, in order to compute the last LBA in bucket m, the method choose the minimum i that satisfies (*).

Suppose a bucket contains $$\sim \frac{n_{LBA}}{2^t} \cdot m \ LBAs,$$

beginning from LBA i. Then, the structure of a bucket is as follows:

| Bucket flags | Entry for LBA i | Entry for LBA i + 1 | . . . | Entry for LBA $i + \frac{n_{LBA}}{2^t} \cdot m$ |
|---|---|---|---|---|

Currently, the bucket flags consist two flags. The first is called the initialized (INIT) flag. the method set INIT=1 if a high percentage of the LBAs in the bucket are uninitialized, and this encoding will reduce the number of bits in these cases. The other flag is the Unit flag, which reduces the number of bits in case of a high percentage of unit sequence (including uninitialized LBAs). The method may save other statistics in the bucket flag, such as the number of allocated LBAs in the bucket and the number unit sequences (using $$\left\lceil \log_2 \left\lceil \frac{n_{LBA}}{2^t} \right\rceil \right\rceil$$

bits).

The entry for each LBA is as follows (according to the following tables):

| Case A.1 | | | | |
|---|---|---|---|---|
| INIT = 0 | UNIT = 0 | ... | Unit_seq = 1 | Cluster number (may include sequence of 0's) |

| Case A.2 | | | | | |
|---|---|---|---|---|---|
| INIT = 0 | UNIT = 0 | ... | Unit_seq = 0 | LViS = 0 | Offset = $\underline{111...10}_{n\ times}$ |

| Case A.3 | | | | | |
|---|---|---|---|---|---|
| INIT = 0 | UNIT = 0 | ... | Unit_seq = 0 | LViS = 1 | Cluster number  Offset = $\underline{111...10}_{n\ times}$ |

| Case A.4 | | | | | |
|---|---|---|---|---|---|
| INIT = 0 | UNIT = 0 | ... | Unit_seq = 0 | LViS = 1 | Cluster number = sequence of 0's |

| Case B.1 | | | |
|---|---|---|---|
| INIT = 1 | UNIT = 0 | ... | empty = 1 |

| Case B.2 | | | | | |
|---|---|---|---|---|---|
| INIT = 1 | UNIT = 0 | ... | empty = 0 | Unit_seq = 1 | Cluster number |

| Case B.3 | | | | | | |
|---|---|---|---|---|---|---|
| INIT = 1 | UNIT = 0 | ... | empty = 0 | Unit_seq = 0 | LViS = 0 | Offset = $\underline{111...10}_{n\ times}$ |

| Case B.4 | | | | | | |
|---|---|---|---|---|---|---|
| INIT = 1 | UNIT = 0 | ... | empty = 0 | Unit_seq = 0 | LViS = 1 | Cluster number  Offset = $\underline{111...10}_{n\ times}$ |

| Case C.1 | | | |
|---|---|---|---|
| INIT = 0 | Unit = 1 | ... | Cluster number (may include sequence of 0's to represent uninitialized sequence) |

| Case C.2 | | | | | |
|---|---|---|---|---|---|
| INIT = 0 | Unit = 1 | ... | Cluster = 000...1 | LViS = 0 | Offset = $\underline{111...10}_{n\ times}$ |

| Case C.3 | | | | |
|---|---|---|---|---|
| INIT = 0 | Unit = 1 | ... | LViS = 0 | Offset = $\underline{111...10}_{n\ times}$ |

| Case C.4 | | | | | |
|---|---|---|---|---|---|
| INIT = 0 | Unit = 1 | ... | Cluster = 000...1 | LViS = 1 | Cluster number  Offset = $\underline{111...10}_{n\ times}$ |

| Case C.5 | | | | | |
|---|---|---|---|---|---|
| INIT = 0 | Unit = 1 | ... | LViS = 1 | Cluster number | Offset = $\underline{111...10}_{n\ times}$ |

Note that in this example save two reserved cluster numbers (0 and 1). Of course, the method may save different cluster numbers.

Case A: In case INIT=0.

The first bit of the entry is Unit_seq, which represents if the LBA was written as a single sequence LBA or not. If so—the method write its appropriate cluster number. In case Unit_seq=0, i.e., the LBA was written as a sequence of 2 or more LBA's.

The next bit is called the Last Valid in Sequence (LViS). There can be two possibilities:

If LViS=0 (depicted in A.2), that means that when the LBA i was written, it was written as a sequence of successive LBA, and it is not the last one. In such case, the offset represents the next LBA of the sequence. I.e., if $$\text{Offset} = \underbrace{111 \ldots 1}_{n \text{ times}}$$

0 then the next LBA of the sequence is LBA i+n+1. In case n≥1, then LBAs i+1, i+2, . . . , i+n were all rewritten to another cluster or deleted.

If LViS=1 (depicted in A.3), then the next field of the entry is the cluster number of the LBA i. In case the cluster number does not equal to 0 (i.e., a non-initialized cluster number), then the method include an offset number. In case n≥1, then LBAs i+1, i+2, . . . , i+n were all rewritten to another cluster or deleted.

In case the cluster number equals to 0 (case A.4 or case A.1), i.e., the LBA was not inserted to the block device, the method do not encode an offset.

Case B: in such case, a large portion of the LBAs in the bucket are not initialized yet. Thus, in order to reduce the number of bits in a bucket, the first bit is the empty flag, which equals one if the LBA is not initialized yet. Otherwise, the method proceed as usual as in cases A (except, of course, case A.4 which does not happen).

Case C: in such case, a large portion of the LBAs are unit sequences. For each LBA, before phrasing its entry, the method compute if the LBA is a part of sequence of more than 2 LBA or not. If there is no information on the LBA (case C.1), the method read the first 10 bits.

In case the cluster number is 0—the LBA is not initialized.

If the cluster number equals to 1 (Cases C.2,C.4), then the LBA is part of sequence. If LViS=0, the method derive the next LBA in the sequence, and the method phrase it as in cases C.3 or C.5 (similar to case A).

If LViS=1, similar to case A, the method derive the corresponding cluster number and its hash value.

Note: the method may encode the offsets in other lossless data compression methods, such as binary format or by Golomb-Rice coding.

Note: The structure of the figures presented above may change into different equivalent formats. For example, the method may present the above structures as following:

| INIT = 0 | Unit = 0 | Unit_seq vector | LViS vector | Cluster number vector | Offset vector |
|---|---|---|---|---|---|

Or

| INIT = 1 | Unit = 1 | Empty vector | Unit_seq vector | LViS vector | Cluster number vector | Offset vector |
|---|---|---|---|---|---|---|

Or

| INIT = 0 | Unit = 1 | Cluster numbers vector | LViS vector | Cluster number vector | Offset vector |
|---|---|---|---|---|---|

Where every segment groups the appropriate fields for each LBA. For example, if a bucket contains $\sim n_{LBA}/2^t \cdot m$ LBAs, beginning from LBA i, then the $j^{th}$ bit in the empty vector represents if LBA i+j is initialized or not. the method do not allocate bits in a vector if it is not necessary, i.e., if empty field of LBA i equals 1, then the method may omit the corresponding bits in the other segments.

Offset Table

In order to deterministically limit the number of bits in every bucket, the method may place the offset vector in another table, called the offset table. For each bucket the method may include a bit representing if the offset is in the bucket or not, and if not a pointer to the corresponding entry in the offset table. Note that before phrasing the whole bucket, the method may need to phrase the corresponding entry in the offset table.

Each entry in the offset table might be pointed by serval buckets. In such case, the format of the offset number might be as follows.

| Bucket number 1 | Offset vector1 | Bucket number2 | Offset vector2 | . . . | Bucket number K | Offset vector K |
|---|---|---|---|---|---|---|

We can use several optimizations on the offset table, such as using a hash function over the bucket number, to reduce the space of each entry.

Of course, the method may implement our system such that in every access to the L2C, the method need to read the offset table. In such case, the bucket number can be ignored. In addition, the method may add to each entry to denote if the bucket contains either $\lceil n_{LBA}/2^t \rceil$ or $\lfloor n_{LBA}/2^t \rfloor$ LBAs.

If the offset table is not used, the method may need to change dynamically the size of each bucket. There are plenty of ways to do so.

GET-L2C (Index i)

Given an LBA index i, it is possible to derive its cluster, its sequence hash and the offset of the LBA in the sequence (with respect to the last LBA of the sequence) as follows:

Given: LBA of index i:
a. Find the corresponding bucket number of i. Save whatever INIT is 1 or 0
b. Jump to the corresponding entry of LBA i
c. If the entry represents an uninitialized LBA→return that LBA does not exists
d. Otherwise, if the entry contains a non-zero cluster number→save the corresponding cluster number. If the offset with n bits of 1's (in case there is no offset, then n=0)→return the triple triple(i)=t(i)$_{cluster}$,t(i)$_{hash}$, t(i)$_{offset}$=(cluster, hash(i+n), n)
   t(i)$_{cluster}$→the cluster number of LBA i
   t(i)$_{hash}$→the hash number corresponding to the sequence of LBA i
   t(i)$_{offset}$→the offset of LBA i with respect to the last LBA of the sequence.

If unit_seq==0 and LViS==1, and the offset contains n 1's, compute the triple of entry i+n+1 and return triple(i)=+n(t (i+$_{cluster}$, t(in +1)$_{hash}$, n+1+t(i+n+n$_{offset}$).

Note that the method may access successive buckets in order to derive the desired answer Sorted (Block)-Cluster Map LBAs within a sorted block-cluster are ordered according to the hash value over the last LBA in the written sequence. Their location (index) is mapped and resolved using dispersive hash metadata structure. I.e., the k$^{th}$ largest hash value in the cluster appears before the k+1$^{th}$ largest value.

All LBAs linked to a bucket N will be stored on flash "before" objects of N+1 bucket. And LBAs mapped to the same bucket are ordered on flash according to physical-slots order of that bucket. LBAs within the same sequence will be written entirely to the cluster.

One might implement the sorted block-cluster as follows: Only the sequences are saved in the cluster, and to find the physical location of an LBA, the method use the ordinal number (sequential index) of the sequence in the cluster and the ordinal number of the LBA in the sequence.

To find the physical location of a sequence, it's ordinal number (sequential index) in a block-cluster is required as an input to sector-starts-map (described below), which encodes the actual location.

The cluster map is a dispersive hash-table representing sequences order information and their sizes.

Per bucket it requires a slot locator, a collision separation vector, valid bits and in addition a sector start map are needed. Examples of buckets, slot locator, collision separation vectors, valid bits, separation trees, and the like are illustrated in U.S. patent application Ser. No. 16/231,649 which is incorporated herein by reference.

An implementation for the sorted block cluster map cam can be seen as following:

The cluster map is divided into buckets, which are managed with a supporting metadata.

| Location of first sequence | Slot locator | Collision separation vector | Unit-sequence-locator (optional) | sector-starts map | Valid bit (optional) |
| --- | --- | --- | --- | --- | --- |

Each LBA index is being mapped to bucket index and a logical slot index. It may be driven using the hash value of the first MSB of the L2C map.

Location of First Sequence

This represents the physical location the sector in the cluster) of the first sequence in the bucket.

Slot Locator

Encodes a physical slot number (location in bucket) not including collisions distinction, and the amount of collisions in a slot. i.e.

If x≥2 colliding objects in a slot—provides range of 'x' slots, one of them holding the sequence with the queried hash value.

Slot-locator encoding described below is an example, the actual compression scheme may be different.

Slot-locator can be a Zero-separated bit-sequence (sort of run-length code) representing number of colliding slots by number of '1's per logical slot.

Consider '01011001100' bit-sequence. In order to find the ordinal number of the sequence corresponding to the logical-slot (L-Slot) #3 (4th slot), need to count equivalent amount of 4 zeros, the following '1's sequence tells how many sequences colliding per this L-Slot (two '1's means 2 sequences), the preceding '1's amount from the beginning of bit-sequence tells the physical slot number (three '1's means 3rd logical slot).

For this coding, inserting a new sequence in the end of cluster requires inserting '1' bit between already existing bits, i.e. performing memory move to make space for this bit.

Allocated space in this example is 2 bits per sequence (slot), e.g. 64 Bytes per hash-bucket (for 256 slots in a hash-bucket).

Collisions Separation Vector

In case of collisions per L-Slot, separation vector facilitates establishing the exact ordinal ordering of the sequence per hash value.

There are two possible implementations—permutation implementation and separation tree (ST) implementation.

Permutation Implementation

Per L-Slot having a collision, separation vector holds an index (possibly compressed) to a permutation of hash parameters providing a perfect Hash-Function for all the sequences in the range. During data insertion, a process to find such permutation is being performed.

Generated permutation also dictates the internal order of objects placed in P-slots range. I.e. adding a new object may reorder the other objects in L-slot.

It should be noted, that the compression scheme may use a different representation of index per every number of colliding objects in slot (t).

Number of collisions (t) handled with a perfect hash function may have an upper boundary, e.g. 6 objects per slot in region-1. Excessive colliding slots will be treated as outcasts.

The process of generating perfect hash function may fail to find a satisfactory permutation, also causing one of the objects to be relocated to outcasts table.

ST Implementation

Per L-Slot having a collision, separation vector holds a Separation Tree (ST) (possibly compressed) which holds the needed to separate the sequences in the L-slot.

The method of solving collisions between a list of sequences using minimal number of bits, uses operations of "insert" and "find". The tree method cut the set of sequences each time into two groups depending on the value of a bit in a chosen index. The decision tree consists of "inner nodes" and "leaves".

One might implement the above operations such that the sequences will be ordered according to their value from left to right.

Example of a Decision-Tree

There are many ways to build a tree that separates these sequences, since sequences can be inserted and removed from the tree by any order. One might implement the tree so that the sequences will ordered according to their value from left to right, with the following keys (i.e., the hash values of the corresponding indices):

key$_1$=0100111
key$_2$=0110010
key$_3$=1011001
key$_4$=0010010
key$_5$=1011010

Here the method show how the method can easily insert, delete and find an object in the list. the method describe here the general algorithms:

Find

To find an object, the method follow the index-nodes until the method reach a leaf, where in each node and continue according to the bits of the key. Using the example depicted in FIG. 1, if the method wish to find $key_3=1011001$, the method do the following:
  a. First node is index 0. The bit in index 0 is 1, hence the method turn right
  b. The second node is the right son and represents index 5. The bit in index 5 is 0, hence the method turn left.
  c. We reached a leaf, and the leaves order is 4 based on the tree structure
  d. The $4^{th}$ location in the order is, clearly, $key_3$.

Simplified Insert

There are multiple ways to implement insert. One way to implement it is to use a simplified insert, a simple insert algorithm. By using such algorithm, the method cannot ensure that the keys in the tree will be sorted.

To insert an object, the method first have to get to a leaf just as described in "find" (such operation is called "fetch key"). Then, in the example above a new key is inserted—$key_6=0110011$. The "find" algorithm will lead us to $key_2$. Then
  a. Fetch the key that currently resides in that leaf—got $key_2=0110010$
  b. Find an index that differ between that key and the inserted key—this is index 6
  c. Transform the leaf into a node representing the index from 2.
  d. Place the two keys according to the bit in the found index The leaf $key_2$ is now replaced, as described in FIG. 1.

Sorted Insert:

We can enforce the tree to keep the keys in order by their value by changing the insert procedure and using a slightly more complicated procedure. Suppose the method insert $key_7=1001000$.
  a. Similar to the simplified insert procedure, it finds the corresponding key. Suppose in our case, the fetch key is $key_3=1011001$.
  b. Instead of replacing the leaf by the corresponding keys (as done in the simplified insert procedure) the algorithm finds the first index where the fetch key (key3) and the inserted key (key6) are different. Denote this index by n. In our example, it is n=2 (in Key 3 is 0, and in Key 7 it is 1).
  c. Then, go to the edge corresponding to those n bits. Such edge connects the first node with index larger than n and the last node with index smaller than n (denoted by U).
  d. Replace the edge with a node with index n, and split the edge into 2 subtrees. One subtree is the previous subtree, and the other is a leaf of the key. This is done according to the inserted key: For example, key 7 in index 2 equals to 1 and therefore it should be in the right side, while the existing subtree (of key 3 and 5) should be in the left side.

There might be a case where a corresponding edge does not exists, i.e., the index of every node in the path between the root and the leaf of fetched key are smaller than n. In such case→the insertion algorithm is similar to the simplified insertion.

Unit-Sequence-Locator (Optional)

Encodes for each sequence in the bucket if it is contains a single LBA or not. May be useful when using compression.

There may be multiple ways to encode the unit-sequence. It may be before or after the SL or the CSV segments.

One naïve way to encode the unit-sequence-locator is to encode 0 for each sequence that is a unit-sequence or to encode 1 otherwise.

Other possible ways to encode the unit-sequence-locator is to encode (unary or binary) the number of unit-sequences in the bucket, and then using an optimal encoding of n-choose-k set, as proposed by the following two methods:

Entropy encoding: to encode a set S of k elements (the set represents which sequences with ordinal number between 1 and n in the bucket are unit sequences) between 1 and n, we encode the set by encoding a number x between 0 and $\binom{n}{k}-1$ using $\lceil \log_2\binom{n}{k} \rceil$ the method can use the following encoding:
  a. Encode(n,k,S):
  b. If k=0→return 0
  c. If n∈S→return Encode (n−1,k,S)
  d. If n∈S→return $\binom{n-1}{k}$+Encode(n−1,k,S)
  e. Decode(n,k,x):
  f. If k=0→return ∅
  g. If $x<\binom{n-1}{k}$ return Decode(n−1,k,x)
  h. If $x\geq\binom{n-1}{k}$ return Decode(n−1,k,x−$\binom{n-1}{k}$))∪{n}

The method may assume that the values of $\binom{n}{k}$ are computed for every n, k in static table, and thus the encoding and decoding can be in linear time.

Offset encoding: Suppose there are n sequences in the bucket of ordinal numbers by indices 0 to n−1.
  a. We partitioned the sequences into $$\left\lceil \frac{n}{M} \right\rceil$$

groups, where group $$0 \leq i < \left\lceil \frac{n}{M} \right\rceil - 1$$

contains M sequences of indices i·M+j for 0≤j≤M−1. The last group, group $$\left\lceil \frac{n}{M} \right\rceil - 1,$$

will contain indices $$M \cdot \left(\left\lceil \frac{n}{M} \right\rceil - 1\right) + j$$

for $$0 \leq j \leq n - M\left(\left\lceil \frac{n}{M} \right\rceil - 1\right),$$

b. The offset encoding might be encoded as follows: Group descriptor Indices
  c. The group descriptor is a series of 1's followed by one represent the number of unit-seq (or, alternatively number of sequences that are not unit-seq) in a group. i.e., if $$\underbrace{111 \ldots 1}_{n\ times}$$

0 for group i. means that mere are n unit sequences in the offset encoding.

d. For each unit sequence (alternatively, a non-unit sequence) in group i, with index i·t+j the method encode in the indices the index j, using $\lceil \log_2 t \rceil$ bits. Thus, the method can derive which sequences are unit sequence or not. The method may choose the number of sequences per group to be $$M = \left\lceil \frac{n}{k \ln 2} \right\rceil$$

to get optimal results.
e. For example, suppose there are n=5 sequences and k=2. Then, $$M = \left\lceil \frac{n}{k \ln 2} \right\rceil = 4$$

groups. Group i for i=0,1 contains LBAs of indices 2·i, 2·i+1 and group 2 contains only LBA 5. Suppose the offset encoding is 110100 011. From the group descriptor (bits 110100) the method derive that group 0 contains two unit sequences, group 1 contains a single unit sequence and group 2 does not contains any unit sequence. From the index's bits 011 the method derive that sequences indices 0, 1, 3 are unit sequences.

The offset encoding can be split into segments allowing easier access and parsing.

Note that in the offset and the entropy encodings, the method may encode parameters n, k.

Sector-Starts-Map

After determining the ordinal number of the sequence (its position in the bucket), an additional mapping vector may be used to find the actual sequence start location (ordinal codeword number) in a block-cluster. In addition, the method may use the sector starts map to encode the size of the sequence in sectors (i.e., how many sectors the sequence takes), and determine the number of sectors spans by the sequence.

The data in Sector-Starts-Map can be for example coded/compressed with run-length codes. There are two possible ways to encode this:

When not using compression, and size of sector equals to size of LBA: the code is with sequences of '1's coding the number of sectors starting in a sequence and sequences separated with zeros. i.e. per sequence the possible values are 0=sequence spans one sector
01=sequence spans two sectors
011=sequence spans three sectors
etc.

The processing steps of Sector-Starts-Map:
count number of '0's=sequence number
count number of '1's=sector number
E.g. for data-bits: 010011, the first sequence spans over 2 sectors, the second sequence spans over a single sector, the third spans over three sectors.

Sectors-starts-map can be split into segments allowing easier access and parsing.

When using compression: the method may encode for every sequence not only the sectors which it begins with, but also the number of LBAs a sequence contains. Since the size of every compressed LBA in NAND is smaller than the size of a sectors, the method may use the following encoding:

0's→represent a (new) LBA in the sequence
10→represent a new sector.
11→represent the sectors-start is ending
In each sector the method may represent the number of LBAs spans by the sectors minus 1
The above method is useful if compression is used.
For example, suppose the sequence begins in sector 4 (can be driven using the data of the previous sequence entries), and the sectors start is 010011

This means that in sector 4 there are 2 LBAs if the sequence, in sector 5 there are 3 LBAs.

If the unit-sequence-locator is used, it is sufficient to encode to every unit sequence if it spans to two sectors or to a single sector. Thus, the method can use a single bit to represent this.

Valid Bits

The method may save for every NAND sector represented by sequence in the bucket a valid bit in order to optimize the garbage collection process of merging two block clusters into one. An alternative approach is using the L2C map to use a random access and check whatever a NAND sector represent a valid LBA or not.

Unsorted Cluster Map

The unsorted cluster map represents an (unsorted) data, such as an initial buffer of the object. It saves only a small percentage of the data in the NAND, and usually are providing high-speed cache for "hot" LBA.

There may be multiple implementations for unsorted cluster map. One implementation is simply to save a mapping between an LBA index, its offset in the unsorted cluster map, and an appropriate valid bit (if needed). Although the mapping of an unsorted block cluster is not constant per LBA, it spans a small percentage of the NAND, and thus does not affects the size of the mapping. Another way to implement an unsorted cluster map is use the above sorted cluster map implementation, but for every sequence the method also add its offset in the cluster.

An unsorted cluster map may represent clusters which are semi-sorted, i.e., the cluster can be partitioned into several min-clusters, which either min-cluster is sorted, but between are not sorted across these min-clusters.

Extensions

The size of the buckets in the different map (i.e., L2C, sorted cluster map, unsorted cluster map) might change dynamically. That means, if the bucket is "full" (an exact definition will be given later), the method link an extension to the bucket increase the size of bucket. Every bucket begins with a base that contain a pointer to next extension, and every extension is selected from a pool of free chunks (implementation is done via "free lists"). All extensions have equal size and the size an extension is shorter than that of a base. The size of every segment is dynamically changed. Examples of extensions are provided in U.S. patent application Ser. No. 16/231,649 which is incorporated herein by reference.

Examples of Flow
GET:
In the GET operation, the method first check the clusters and the offsets for each LBA key in the sequence (using GET-L2C (index i)). the method derive if the given sequence is either appears entirely in one cluster, or it is in several places across the NAND.

Given sequence of LBA indices between keys $key_{low}$ and $key_{high}$. The method may partition these keys into serval sub-sequences $[key_{low}=k_0, k_1], [k_1, k_2], \ldots, [k_n, k_{n+1}=key_{high}]$ where each key in $[k_i, k_{i+1}]$ are in the cluster (represented by a single sequence in the L2C map). For each sub-sequence, the method may derive if the LBAs in the sequence do not exists, if they are in unsorted cluster or they are in a sorted cluster. Using the cluster map, using the Sectors-Start, the method can derive the physical location of each LBA (since the LBA are sorted).

PUT:

Initially, when a sequence of LBA are inserted in the system, they are inserted into an initial buffer which is an unsorted block cluster buffer. the method update the mapping of the corresponding LBAs of the inserted sequence as well as the unsorted cluster map. When the initial buffer is full, the method flash the data to either a sorted cluster (if the initial buffer size equals to the size of a sorted cluster) or semi-sorted cluster (similar to flashing the data into an unsorted SLC data). The method may use folding in order to flash data from semi-sorted clusters into sorted clusters. The flashing and folding process can be done similarly to a merge sort between two sorted arrays, i.e., merge LBAs according to their indices until the cluster becomes sorted.

In case of rewrite, the method may need to invalidate the valid bit of the LBA in the cluster, if a valid bit method is used.

The method may use extensions to increase the bucket size of the different tables.

Delete:

We simply state that the LBA does not exists, and the method may need to invalidate the valid bit of the LBA in the cluster, if a valid bit method is used.

Garbage Collection (GC):

The method may use GC per sorted block clusters to remove invalid LBAs.

In garbage collection the method must order the LBA according to their hash value. In addition, the GC may be done between two or three block clusters victims to a single target. This can be done by allocating a database in the NAND which contains the LBA indices, or by deriving it from the cluster map and the NAND. the method then need merge the keys of victims to their hash value, and then derive which keys will enter the new BC and which do not. After deciding the keys that entered the new BC, the L2C and cluster map entries of the corresponding keys are change, similar to a rewrite operation.

Recycling Key

The method may support recycling operation in order to reduce the offset value of a LBA in the bucket.

In such case, the method fetch the LBA from the NAND, and simply copy it to a new cluster.

This can be useful, for example, in cases where the LBA is the First valid LBA of a large sequence, the sequence is composed from invalid LBAs.

Merge in L2C Map

The method may support L2C merge, to reduce the number of bits in every L2C bucket.

In such case, the method read single-LBA sequence with another sequence with a successive key, merge them together, and then write them to a new BC.

Merge Sorted Cluster Map

The method may implement a merging between two single-LBA sequences and a single-LBA sequence that are in the same Lslot in the sorted cluster map, and eventually which will reduce the SL and CSV bits.

Figure 1:
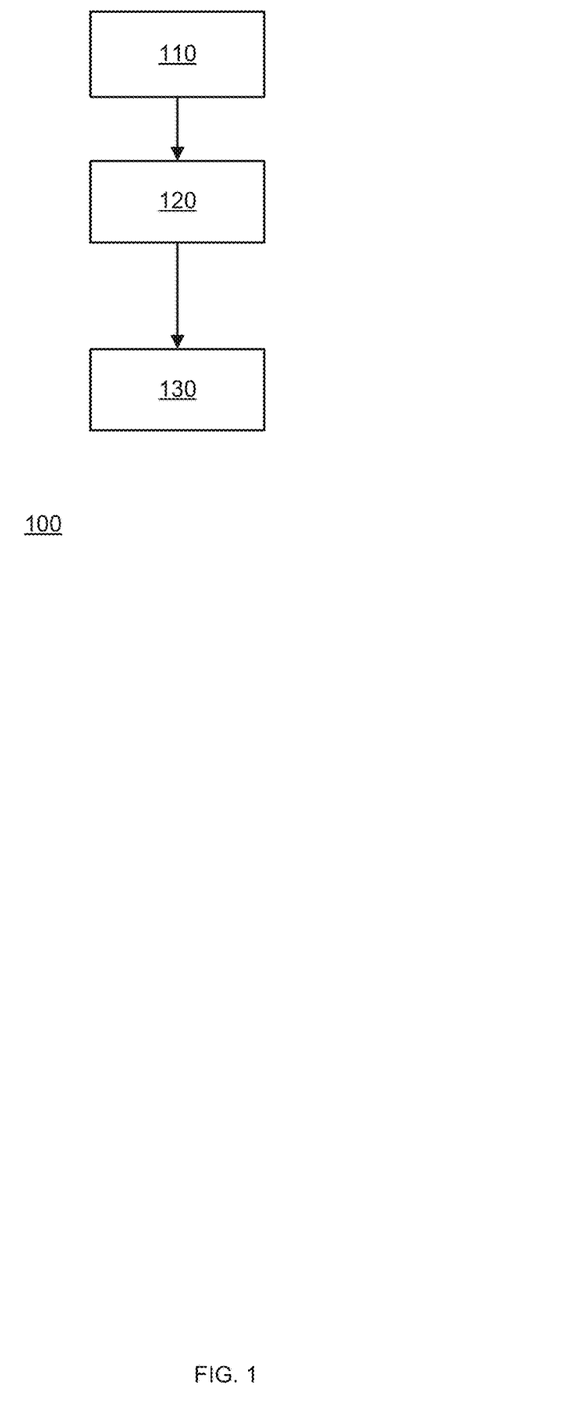
FIG. 1 is an example of a method.

FIG. 1 illustrates method 100.

Method 100 may be accessing a block of information stored in a solid state drive (SSD) memory.

Method 100 may start by step 110 of obtaining, by an SSD controller, an identifier associated with the block of information.

Step 110 may include accessing, using the identifier, a first data structure that maps identifiers to cluster maps. The first data structure may be a L2C data structure. Different clusters are associated with different cluster maps.

The first data structure may include block sequence metadata. The block sequence metadata allows to retrieve a block based on the sequences that includes the block—if such a sequence exists.

For at least one cluster map, the block sequence metadata may include a sequence identifier of a sequence of blocks of information that are sequentially written to the SSD memory and are stored together in a cluster of the SSD memory. Stored together may mean stored within the cluster, stored near each other, stored at a same codeword, stored in a sequential manner, and the like.

Step 110 may be followed by step 120 of accessing a cluster map of a cluster that is associated with the sequence provide block retrieval information.

Step 120 may be followed by step 130 of retrieving the block of information from the SSD memory, using the block retrieval information.

The first data structure may include multiple buckets, wherein the identifier is a bucket identifier that identifies a bucket out of multiple buckets. In such a case step 110 may include accessing the bucket identified by the identifier.

The following example of the content of a bucket may refer, for example, to various fields and/or fields and/or one or more flags including INIT, UNIT, Unit_seq, LViS, offset, cluster number, and empty. It should be noted that the offset may be replaced by a pointer to an offset data structure.

Each bucket of the multiple buckets may include an indication regarding a percentage of blocks of information of the bucket that are initiated in the SSD memory. See, for example, the initialized (INIT) flag.

Each bucket of the multiple buckets may include metadata regarding one or more blocks of information, the metadata of a block of information is indicative whether the block of information is part of a sequence or not.

Each bucket of the multiple buckets may include metadata regarding one or more blocks of information, the metadata of a block of information that is a part of a sequence further indicates whether the block of information is a last block of information of the sequence.

Each bucket of the multiple buckets may include metadata regarding one or more blocks of information, the metadata of a block of information that is a part of a sequence and is a last block of information of the sequence further may include a cluster identifier of cluster related to the sequence.

Each bucket of the multiple buckets may include metadata regarding one or more blocks of information, the metadata of a block of information that is a part of a sequence and is not a last block of information of the sequence further may include an offset to a last block of information of the sequence.

Each bucket of the multiple buckets may include metadata regarding one or more blocks of information, the metadata of a block of information that is a part of a sequence and is not a last block of information of the sequence further may include a pointer to an offset stored in an offset data structure, the offset is to another block of information of the sequence.

Different sequences of a cluster may be sorted according to hash values associated with the sequences, wherein the hash values are either stored in the first data structure or are calculated based on a content of the first data structure, and wherein the block retrieval information reflects the sorting of the sequences.

Different sequences of a cluster may be sorted according to times of arrival of the sequences, and wherein the block retrieval information reflects the sorting of the sequences.

The different sequences of a cluster may be sorted in any other manner.

The different sequences of a cluster are unsorted, and the block retrieval information reflects may reflect the unsorting.

Figure 2:
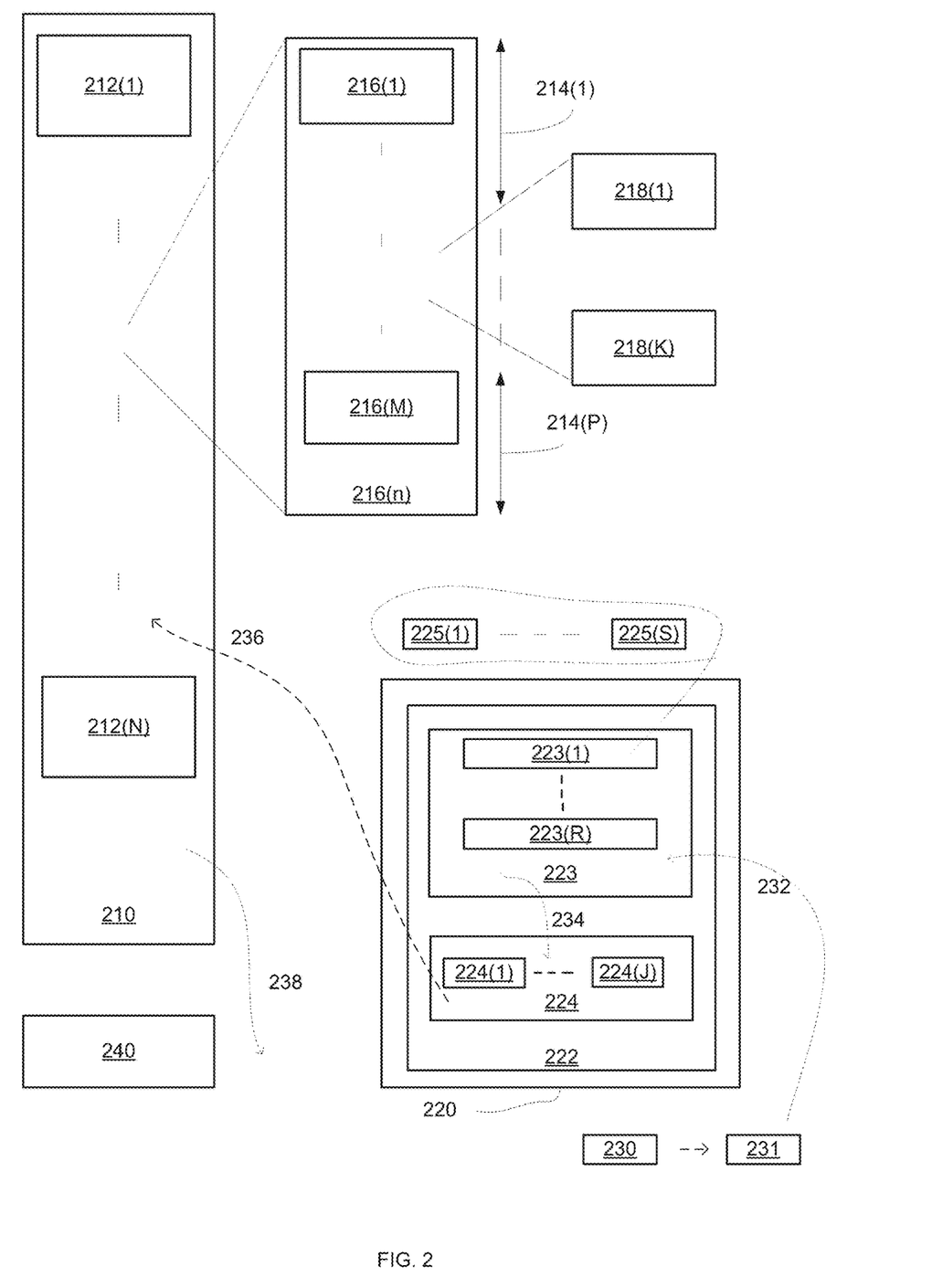
FIG. 2 illustrates a SSD controller, SSD memory, another memory such as random access memory (RAM) memory and various data structures

FIG. 2 illustrates a SSD controller 240, SSD memory 210, another memory such as random access memory (RAM) memory 220 and various data structures.

SSD memory 210 includes multiple clusters 212(1)-212(N). A n'th cluster (n ranges between 1 and N) 216(n) may store multiple sequences 216(1)-216(M) of blocks. A m'th sequence (m ranges between 1 and M) may include multiple blocks 218(1)-218(K).

A cluster—for example—cluster 216(n) may include multiple L-slots 214(1)-214(P). A sequence is usually stores within a single L-Slot.

N, M, K, and P are positive integers that exceed one.

RAM memory 220 may store metadata 222 for managing storage and/or access of the blocks within the SSD memory 210.

The metadata 222 may include a first data structure 223 and cluster maps 224. The first data structure may include R buckets 223(1)-223(R) the value of R may equal to the number of sequences—M. A bucket may include S fields 225(1)-225(S), such as the fields illustrated in the specification—for example—any combination or sub-combination of fields such as INIT, UNIT, Unit_seq, LViS, offset, cluster number, and empty.

The metadata 222 further includes cluster maps 224(1)-224(J)—for example one cluster map per cluster. The value of J may equal the value of N.

FIG. 2 also illustrates a process for reading a block—a request to access 230 is received (for example by SSD controller 240), an identifier 231 is generated (either include din the request or generated bason on a content of the request), the identifier 231 is used to access the first data structure 223. The first data structure outputs access information for accessing the relevant cluster map. The cluster may is accessed to provide retrieval information 236 for retrieving block 238 from the SSD memory.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for accessing a block of information stored in a solid state drive (SSD) memory, the method comprises:
   obtaining, by an SSD controller, an identifier associated with the block of information;
   accessing, using the identifier, a first data structure that maps identifiers to cluster maps;
   wherein the first data structure comprises block sequence metadata, wherein for at least one cluster map, the block sequence metadata comprises a sequence identifier of a sequence of blocks of information that are sequentially written to the SSD memory and are stored together in a cluster of the SSD memory;
   accessing a cluster map of a cluster that is associated with the sequence provide block retrieval information; and
   retrieving the block of information from the SSD memory, using the block retrieval information.

2. The method according to claim 1 wherein the first data structure comprises multiple buckets, wherein the identifier is a bucket identifier that identifies a bucket out of multiple buckets.

3. The method according to claim 2 comprising accessing the bucket.

4. The method according to claim 2 wherein each bucket of the multiple buckets comprises an indication regarding a percentage of blocks of information of the bucket that are initiated in the SSD memory.

5. The method according to claim 2 wherein each bucket of the multiple buckets comprises metadata regarding one or more blocks of information, the metadata of a block of information is indicative whether the block of information is part of a sequence or not.

6. The method according to claim 2 wherein each bucket of the multiple buckets comprises metadata regarding one or more blocks of information, the metadata of a block of information that is a part of a sequence further indicates whether the block of information is a last block of information of the sequence.

7. The method according to claim 2 wherein each bucket of the multiple buckets comprises metadata regarding one or more blocks of information, the metadata of a block of information that is a part of a sequence and is a last block of information of the sequence further comprises a cluster identifier of cluster related to the sequence.

8. The method according to claim 2 wherein each bucket of the multiple buckets comprises metadata regarding one or more blocks of information, the metadata of a block of information that is a part of a sequence and is not a last block of information of the sequence further comprises an offset to a last block of information of the sequence.

9. The method according to claim 2 wherein each bucket of the multiple buckets comprises metadata regarding one or more blocks of information, the metadata of a block of information that is a part of a sequence and is not a last block of information of the sequence further comprises a pointer to an offset stored in an offset data structure, the offset is to another block of information of the sequence.

10. The method according to claim 2 wherein different sequences of a cluster are sorted according to hash values associated with the sequences, wherein the hash values are either stored in the first data structure or are calculated based on a content of the first data structure, and wherein the block retrieval information reflects the sorting of the sequences.

11. The method according to claim 2 wherein different sequences of a cluster are sorted according to times of arrival of the sequences, and wherein the block retrieval information reflects the sorting of the sequences.

12. The method according to claim 2 wherein different sequences of a cluster are sorted.

13. The method according to claim 2 wherein different sequences of a cluster are unsorted, and wherein the block retrieval information reflects the unsorting.

14. The method according to claim 2 wherein at least one first bucket is linked to a first extension bucket; and wherein the method comprises accessing the first extension bucket.

* * * * *